April 24, 1951   W. A. DERR   2,550,109
REMOTE METERING SYSTEM
Filed June 1, 1948
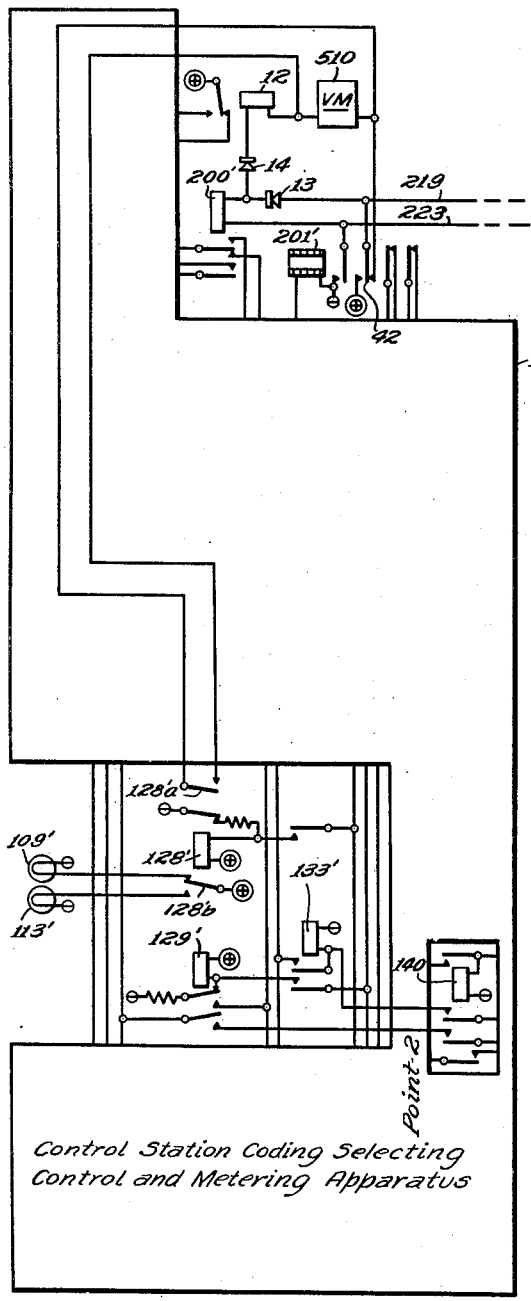
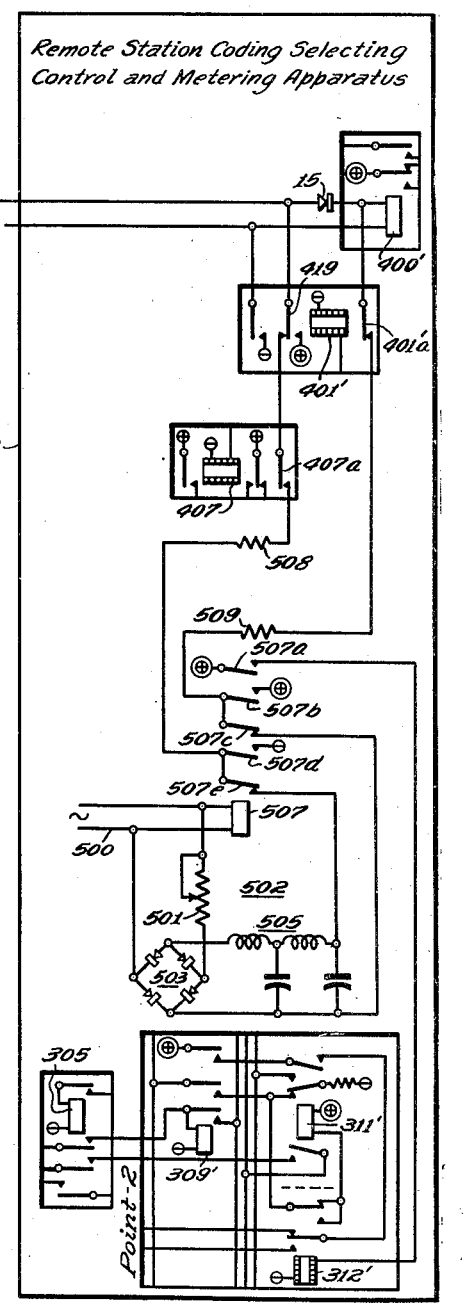
WITNESSES:
Robert C. Baird
F. V. Giolma
INVENTOR
Willard A. Derr.
BY E. M. Crawford
ATTORNEY Patented Apr. 24, 1951

2,550,109

UNITED STATES PATENT OFFICE 2,550,109

REMOTE METERING SYSTEM

Willard A. Derr, Wilkinsburg, Pa., assignor to Westinghouse Electric Corporation, East Pittsburgh, Pa., a corporation of Pennsylvania Application June 1, 1948, Serial No. 30,299

9 Claims. (Cl. 177—351)

My invention relates, generally, to remote metering systems, and it has reference, in particular, to continuous remote metering systems for use with signal systems, such as supervisory control systems and the like.

Generally stated, it is an object of my invention to provide a remote metering system that is simple and inexpensive to manufacture, and is reliable and efficient in operation.

More specifically, it is an object of my invention to provide, in a supervisory control system, for obtaining continuous remote metering indications without requiring the use of a base metering current.

It is an important object of my invention to provide, in a supervisory control system, for using the line conductors to provide a high impedance series telemetering circuit without interrupting the relatively low impedance parallel line circuit of the supervisory control system.

Another object of my invention is to provide, in a remote metering system, for maintaining line supervision with only either a continuous metering current or a supervision current of low magnitude.

Yet another object of my invention is to provide, in a remote metering system, for indicating to an operator at a control station whenever the metering potential is removed at a remote station.

It is also an object of my invention to provide, in a supervisory control system, for normally connecting the signal channel for a remote metering operation, so that the metering circuit is restored whenever a supervisory or control operation is completed.

Another important object of my invention is to provide a remote meter system wherein no calibration of the system is required at the control station.

It is also an important object of my invention to provide a remote metering system which has a relatively high impedance and is not materially affected by the low leakage resistance of the signal channel being used for transmitting the metering indication.

Other objects will in part be obvious, and will in part be explained hereinafter.

In practicing my invention in one of its forms, a telemetering receiving meter is connected to the line of a supervisory control system at the control station and is disposed to be shunted by the supervisory receiving relay of the metering supervision point whenever the metering potential is removed from the line at the remote station. A telemetering transmitter is provided at the remote station for producing a direct current voltage proportional to the voltage of the circuit which is to be metered, and rectifiers are used to provide a series type metering circuit over the line without interfering with the low impedance shunt connection of the line relays. A control relay at the remote station responsive to the existence of voltage on the circuit to be metered normally connects the transmitter to the line through contacts of the remote station sending and receiving relays. The control relay returns the line to the station battery upon the loss of voltage from a circuit to be metered and initiates a code signal for indicating at the control station a loss of circuit voltage.

For a more complete understanding of the nature and scope of my invention, reference may be made to the following detailed description, which may be read in connection with the accompanying drawing, in which the single figure is a diagrammatic view of a remote metering system for use with supervisory control apparatus at control and remote stations.

Referring generally to the drawing, the single figure represents a continuous remote metering system which is applied to a supervisory control system substantially identical with that shown and described in the Derr et al. Patent No. 2,409,840, which issued on October 22, 1946. The system of the Derr et al. patent is a modification of the system of Patent No. 2,091,301, which issued on August 31, 1937 to H. P. Boswau.

For the purpose of simplification, the four figures of the Derr et al. patent have been combined into a single figure with coding, selecting and control apparatus of the control station represented by the enclosure 11, and coding, selecting and control apparatus of the remote station represented by the enclosure 19. Most of the elements of the system of the Derr et al. patent are not shown, but are considered as contained within their respective enclosures.

Certain relays and circuits of the system of the Derr et al. patent have been modified slightly, and new relays have been added in order to perform functions different from those of the apparatus of the Derr et al. patent. Entirely new elements have been designated by reference characters not found in the Derr et al. patent, whereas other elements which are substantially identical with, or are equivalent to, elements of the system of the Derr et al. patent, have been designated by means of prime numbers corresponding to the designations in the Derr et al. patent, in order to more readily identify them.

Referring to the single figure of the drawing, it will be seen that the line relays 200' and 400' are connected to the conductors 219 and 223 of the signal channel exactly as shown in the Derr et al. patent. The line supervision relay 12 is also shown as connected in series circuit relation with the conductors 219 and 223, and the receiving relays 200' and 400' by means of the rectifier devices 13, 14 and 15.

In order to provide for effecting continuous telemetering over the line conductors 219 and 223, points 2 of the supervisory control apparatus at the control and remote stations have been utilized. At the control station a supervisory receiving relay 128', an individual point relay 129' and a point selecting relay 133' have been shown in an opening or window in the enclosure 11 for equipping point 2. These relays have been connected into the counting chain at relay 140 in the identical manner which the corresponding relays 128, 129 and 133 are shown connected to relay 139 of point 1, in the Derr et al. patent.

At the remote station, a code control relay 309', an individual point relay 311' and a signal relay 312' have been shown in a window or opening in the enclosure 19 for equipping point 2 of the remote station coding, selecting and control apparatus for transmitting the necessary supervisory and selection codes in connection with the metering point. These relays are shown connected with relay 305 of the counting chain at point 2 in exactly the same manner that the corresponding relays 309, 311 and 312 are connected to relay 304 of point 1 in the Derr et al. patent.

In order to provide for metering an electrical quantity, such as, for example, the voltage of an electrical circuit represented by the conductors 500, a telemetering transmitter 502 may be provided at the remote station. The transmitter may comprise, for example, a rectifier bridge circuit 503 which may be connected to the conductors 500 and to a filter circuit 505 for producing a direct current voltage proportional to the voltage of the circuit conductors 500.

A control relay 507 may be provided for normally connecting the transmitter 502 to the line conductors 219 and 223 through armatures 507c and 507e, whenever the circuit conductors 500 are energized. In order to prevent interference between the telemetering transmitter 502 and the supervisory control apparatus, the transmitter may be connected to the line conductors through armature 407a of the remote station receiving relay 407, armature 419 of the remote station driving relay 401', and armature 401'a of the same relay, so as to provide for disconnecting the transmitter from the line conductors whenever a supervisory or control signal is being transmitted. Impedance means, such as the resistors 508 and 509, may be connected in series circuit relation between the transmitter 502 and the line conductors. These resistors may, for example, have resistance values on the order of 2000 ohms and 9,000 ohms, respectively, so as to reduce the metering current to a value below that required for operation of the line relays 200' and 400'.

It will be noted that the transmitter 502 is normally connected to the line conductors in series circuit relation with the line relays 200', 400' and the line supervision relay 12 by reason of the rectifier devices 13, 14 and 15. The polarity applied to the line conductors is reversed from that applied thereto during a supervisory coding operation, and the series metering circuit is given a high impedance characteristic independently of the parallel line circuit. The control relay 507 may be disposed in its deenergized position to connect the line conductors to the remote station battery through armatures 507b and 507d with a reverse polarity similar to that used for metering, so as to provide continuous line supervision. The control relay 507 may be further disposed to control the operation of the signal relay 312' through armature 507a so as to provide for transmitting a supervisory signal in the event of loss of voltage on the circuit conductors 500.

At the control station, a voltmeter or telemetering receiver 510 may be connected in series circuit relation with the line supervision relay 12 and the line conductors, so as to respond to the voltage applied to the conductors from the telemetering transmitter 502. By connecting the telemetering receiver to the line conductor 219 through armature 42 of the driving relay 201', the receiver will be disconnected from the conductor 219 whenever the armature 42 engages its front contact member for the purpose of applying positive potential to the conductor during a supervisory or control code sending operation.

In order to prevent a false indication on the telemetering receiver from the application of the remote station battery voltage in the event of failure of voltage on the source conductors 500 at the remote station, armature 128'a of the supervisory receiving relay 128' may be utilized to shunt the receiver 510 when the relay is in its deenergized position in response to an indication from the remote station that the voltage on the source conductors 500 has failed.

Signal lamps 109' and 113' corresponding to the red and green circuit breaker lamps 109 and 113 of the Derr et al. patent may be utilized to provide an indication of whether the conductors 500 are energized or not by selectively connecting them to direct positive through armature 128'b of the supervisory receiving relay 128'.

In normal operation the system is set up for continuous metering, and with voltage on the conductors 500, the control relay 507 will be in the energized position, and the telemetering transmitter 502 will be connected to the line conductors 219 and 223 over an obvious circuit through armatures 507c and 507e, and resistors 509 and 508. The telemetering receiver 510, which is normally connected to the line conductors through the rectifier device 14 and armature 42 of the driving relay 201', in series circuit relation with the transmitter and the coils of the line relays 200' and 400' thus indicates the value of the voltage produced by the transmitter 502. The telemetering system may be initially calibrated to secure the proper reading on the receiver 510, by adjusting the rheostat 501 in circuit relation with the bridge circuit 503. The individual point relay 129' at the control station will be normally energized, and the supervisory receiving relay 128' will also be energized. The shunt will be removed from the telemetering receiver at armature 128'a, and the red lamp 109' will be energized over armature 128'b.

Should a supervisory control operation be initiated from the control station, the driving or impulsing relay 201' at the control station will be energized to transmit the appropriate code, and the receiver 510 will be accordingly disconnected from the conductor 219 at armature 42, each time the driving relay is energized. At the remote station the receiving relay 407 will be energized in response to receipt of the code transmitted from the control station, and the transmitter 502 will accordingly be disconnected from the conductor 219 at armature 407a. Should a supervisory or control operation be initiated from some other point at the remote station, the driving relay 401' at the remote station will be energized to send the appropriate code. Accordingly, the transmitter 502 will be disconnected from the line conductor 219 at armatures 419 and 401'a each time the driving relay is energized.

During metering the metering current operates to maintain the line supervision relay 12 energized and provides for line supervision. Should the voltage of the source conductors 500 fail, the control relay 507 will return to the deenergized position. Accordingly, the line conductors 219 and 223 will be transferred from the transmitter 502 to the remote station battery at armatures 507d and 507b, so as to continue supervision of the signal channel by means of the remote station battery.

At the same time, a circuit is completed over armature 507a for the signal relay 312'. Accordingly, the signal relay 312' operates to the energized position, and momentarily interrupts the energizing circuit for the individual point start relay 311'. The point relay thereupon operates to transmit a point selection code to the control station in the usual manner for energizing the point relay 133'.

Upon the receipt of the check code, the code control relay 309' at the remote station is energized and a supervision code is transmitted in accordance with the operating position of the signal relay 312', which results in deenergization of the supervisory receiving relay 128' at the control station as it is shunted down through the supervisory control equipment. This provides a shunt around the receiver 510 through armature 128'a to prevent false metering indications from the line supervision voltage. At the same time, an obvious energizing circuit is provided for the lamp 113' while the previous energizing circuit for the lamp 109 is interrupted at armature 128'b, indicating to the operator a loss of voltage at the remote station. The supervisory equipment is restored to its normal condition in the manner described in the Boswau Patent No. 2,091,301 hereinbefore referred to.

Upon the return of voltage, the control relay 507 returns to the energized position and the transmitter 502 will again be connected to the line conductors 219 and 223. At the same time, the signal relay 312' will be deenergized, so that the energizing circuit for the point start relay 311' will again be interrupted. The point selection code will be sent out in the usual manner, resulting in selection of the point relay 133' at the control station, energization of the point relay 309' at the remote station, and energization of the supervisory relay 128' at the control station and the removal of the shunt from the telemetering receiver 510.

Failure of the battery at either the control station or the remote station momentarily upsets the supervisory equipment in the manner described in the Boswau Patent 2,091,301. Upon restoration of battery voltage, the system is returned to normal as set forth in the Boswau patent.

From the above description and the accompanying drawing, it will be apparent that I have provided a simple and effective arrangement which can be used for telemetering any quantity or characteristic without the use of a base current when line supervision is not required. A high impedance series metering circuit is normally provided, without disturbing the parallel connections of the supervisory line relays. When line supervision is desired, the same arrangement may be used, utilizing the metering current for supervision, and providing a supervision current of extremely low magnitude for use when not metering. This system is extremely satisfactory even over supervisory control lines which may have low reactive impedance, since the metering circuit has an inherently high impedance which is independent of the low impedance supervisory line circuit.

By utilizing a telemetering system embodying the features of my invention, no calibration is necessary at the dispatching office, since it is not necessary to use a base metering current to maintain the metering circuit, as both the metering circuit and the supervisory line circuit are normally completed.

The system provides for continuous telemetering except when the supervisory control equipment is in operation. Under these conditions, the telemetering equipment is disconnected from the signal channel.

Little or no calibration of the system is required after initial calibration of the receiver, since any change in the resistance of the line wires has a substantially negligible effect over the all-over resistance of the high impedance telemetering circuit.

Since certain changes may be made in the above-described construction, and different embodiments of the invention may be made without departing from the spirit and scope thereof, it is intended that all the matter contained in the above description and shown in the accompanying drawing shall be considered as illustrative, and not in a limiting sense.

I claim as my invention:

1. A remote metering system for use in continuous metering with a signal channel connecting supervisory control equipment at remote and control stations comprising, a telemetering receiver at the control station disposed to be connected to the signal channel, metering means at the remote station including a telemetering transmitter operable to produce a metering voltage proportional to an electrical quantity in a circuit to be metered, control means at the remote station operable to different positions in response to energization and deenergization of the circuit to be metered to effect connection to and disconnection from the channel of the metering means, said control means being connected to effect operation of the supervisory control means at the remote station to transmit a signal to the control station, and relay means at the control station operable in response to operation of the supervisory control means to render the telemetering receiver effective or ineffective in accordance with the position of the control means.

2. The combination with a supervisory control system having sending and receiving means at a control station and a remote substation connected by a signal channel, of metering means operable to produce a metering voltage proportional to an electrical quantity of a circuit to be metered, relay means at the remote substation operable to one position in response to energization of said circuit to effect connection of the signal channel to said metering means and to another position in response to deenergization of said circuit to connect the channel to a remote substation source of control and effect operation of the supervisory control sending means at the remote substation voltage, metering means at the control station connected to the signal channel, and circuit means at the control station controlled by the supervisory control receiving means at the control station in response to operation of said sending means at the remote substation to render the metering means at the control station ineffective.

3. The combination with a supervisory control system including supervisory control sending means at control and remote stations operable to effect energization of a signal channel extending therebetween with impulses of electrical energy of one polarity from control sources at the control and remote stations and receiving means at said stations selectively responsive to said impulses, of supervision means at the control station responsive only to a voltage opposite in polarity to that of the impulses of the supervisory control sending means, remote metering receiving means associated with the channel at the control station, remote metering transmitting means at the remote station operable to produce a metering voltage proportional to an electrical quantity of a circuit to be metered, and relay means selectively responsive to energization and deenergization of said circuit to connect the signal channel to the transmitting means or the remote station control source to energize it with a polarity opposite to the polarity of the impulses.

4. The combination with a signal channel providing a shunt supervisory connection between a control station and a remote station each having sending and receiving means selectively operable to produce and to respond to electrical impulses of one polarity, of a continuous remote metering system comprising a metering receiver at the control station responsive to a voltage of the opposite polarity to said impulses, a metering transmitter at the remote station operable to produce a metering voltage proportional to an electrical quantity of a circuit which is to be metered, a control relay operable to one position in response to energization of said circuit and to another position in response to deenergization thereof, circuit means connecting the transmitter to the signal channel with a polarity opposite to that of the impulses including contact members of said control relay closed in said one position, rectifier means connected in circuit relation with the signal channel to provide a series metering circuit including the metering transmitter and receiver and the supervisory control receiving means, and impedance means connected in the metering circuit limiting the current in the metering circuit to a value below that required to operate the supervisory control receiving means.

5. The combination with a supervisory control system having supervisory control equipment at control and remote stations including supervisory receiving relays connected in shunt circuit relation by a signal channel and supervisory sending relays disposed to energize the channel with a given polarity, channel supervision means at the control station, rectifier means connected in circuit relation with the channel and the supervision means to provide a series supervision circuit including the receiving relays for a polarity opposite to said given polarity, of a telemetering receiver connected in circuit relation with said supervision means and channel, a telemetering transmitter at the remote station operable to produce a control voltage substantially proportional to an electrical quantity of a circuit to be metered, relay means at the remote station operable to different positions in response to energization or deenergization of said circuit to connect the channel to either the telemetering transmitter or a remote station source with a polarity opposite to said given polarity.

6. A remote metering system comprising, supervisory control sending and receiving means at remote and control stations connected by a signal channel, said supervisory control means including receiving relays at each station connected by the channel and sending relays at each station operable to connect the channel to a station source of control voltage of a given polarity, metering receiving means at the control station, circuit means including rectifier means connecting the metering receiving means in series circuit relation with the receiving relays and the signal channel for a voltage of the opposite polarity, telemetering transmitting means at the remote station operable to produce a variable voltage proportional to an electrical quantity of a circuit to be metered, and control means at the remote station including a relay operable to one position in response to energization of said circuit to connect the transmitting means to the channel with said opposite polarity, said relay being operable to another position in response to deenergization of said circuit to initiate operation of a supervisory relay to render the metering receiving means ineffective.

7. A remote metering system comprising, a supervisory control system having receiving means at remote and control stations connected in shunt circuit relation by a signal channel and supervisory sending means at each station operable to connect the channel to sources of control voltage of one polarity at said stations, a metering receiver at the control station, circuit means including rectifier devices connecting the metering receiver effectively in series circuit relation with the remote and control station receiving means and the channel without interrupting the shunt circuit connection of the receiving means, additional circuit means including contact members of a supervisory relay at the control station connected in shunt circuit relation with the metering receiving means, a telemetering transmitter at the remote station operable to produce a voltage proportional to an electrical quantity of a circuit to be metered, and a control relay at the remote station operable to one position in response to energization of said circuit to connect the channel to the telemetering transmitter with a polarity opposite to that of the control voltage, said control relay being operable to another position upon deenergization of said circuit to effect operation of the remote station supervisory sending means to effect operation of the supervisory relay at the control station to shunt the telemetering receiving means.

8. In a remote metering system, the combination with a relatively low impedance signal channel connecting signal apparatus at remote and control stations in a parallel circuit relation, of a metering transmitter at one station, a metering receiver at the other station, and circuit means including a plurality of rectifier devices connecting the transmitter and the receiver to the channel in a high impedance series relation with said signal apparatus circuit without appreciably affecting the impedance of the parallel circuit provided by the signal channel.

9. The combination with supervisory control equipment including receiving and sending means at each of remote and control stations having a signal channel connecting the receiving means of the supervisory control equipment at the remote and control stations in parallel circuit relation, of a metering transmitter at the remote station, a metering receiver at the control station, and circuit means including rectifier devices connected in the signal channel and between the channel and the metering receiver and contact means of the signal responsive elements normally connecting the receiver and the transmitter in series circuit relation with the receiving means and at least a portion of the signal channel for a metering operation.

WILLARD A. DERR.

REFERENCES CITED

The following references are of record in the file of this patent:

UNITED STATES PATENTS

| Number | Name | Date |
| --- | --- | --- |
| 1,184,685 | Flagg | May 23, 1916 |
| 2,037,565 | Dozier | Apr. 14, 1936 |
| 2,123,220 | Weld | July 12, 1938 |
| 2,409,840 | Derr et al. | Oct. 22, 1946 |

FOREIGN PATENTS

| Number | Country | Date |
| --- | --- | --- |
| 270,325 | Great Britain | Nov. 24, 1927 |